United States Patent [19]

May

[11] 4,205,765
[45] Jun. 3, 1980

[54] PASTRY BAG

[76] Inventor: Karen M. May, 122 Residence, El Dorado, Kans. 67042

[21] Appl. No.: 880,374

[22] Filed: Feb. 23, 1978

[51] Int. Cl.² ............................................. B65D 35/44
[52] U.S. Cl. .................................................. 222/107
[58] Field of Search ................. 222/107; 24/DIG. 18; 150/3; 206/628, 633; 2/DIG. 6

[56] References Cited

U.S. PATENT DOCUMENTS

| | | | |
|---|---|---|---|
| 2,092,444 | 9/1937 | Dennery | 222/107 |
| 3,163,288 | 12/1964 | Arvidsson | 206/633 |
| 3,826,296 | 7/1974 | Morris | 150/3 |

*Primary Examiner*—Allen N. Knowles
*Attorney, Agent, or Firm*—Robert E. Breidenthal

[57] ABSTRACT

A pastry bag improved in that a continuous band of coacting fastener components are secured to the inside of the bag a spaced interval from its large filling end; such components being of the conventional pressure engageable, forcibly disengageable, hook and loop type. Preferably, the bag has folds facilitating proper registry of the fastener components. The interval, which is slitted along the fold line, allows finger gripping for forcibly detaching the components.

3 Claims, 7 Drawing Figures

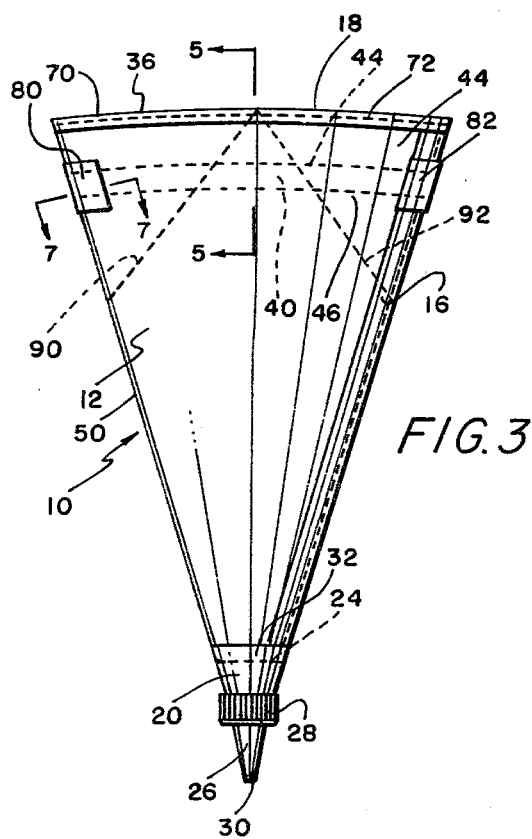
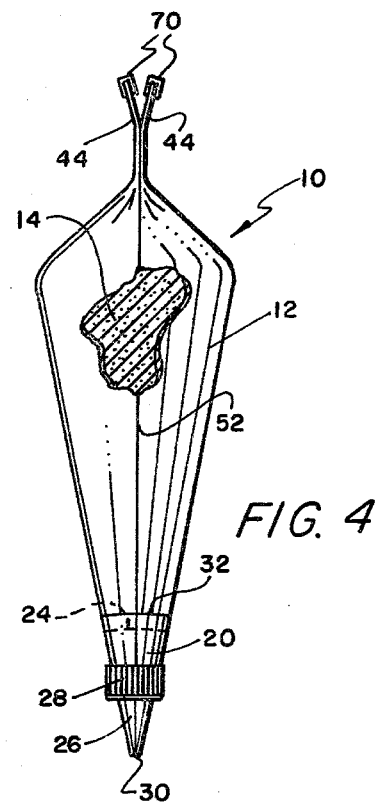
FIG. 3
FIG. 4
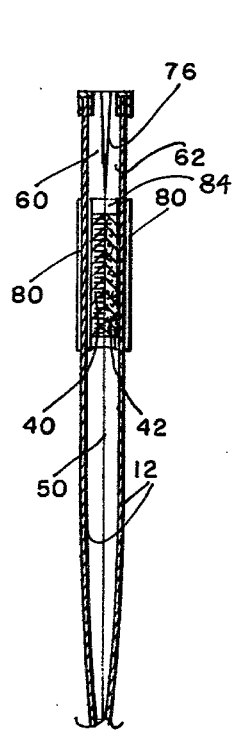
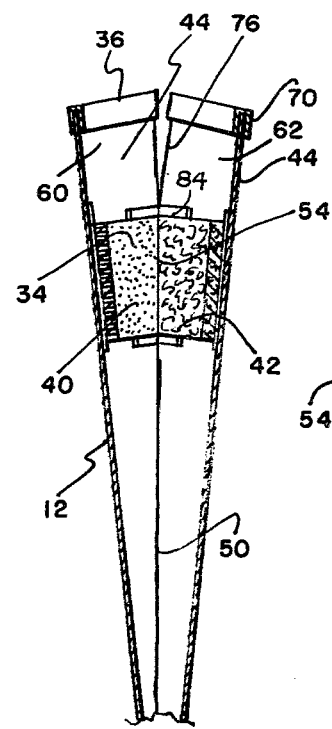
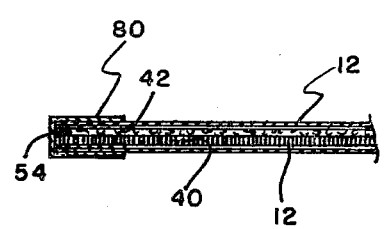
FIG. 5   FIG. 6   FIG. 7

PASTRY BAG

The present invention relates to new and useful improvements in flexible and collapsible pastry bags employed for dispensing, through selected tips of an assorted variety thereof, a viscous comestible or flowable confection in the course of decorating the exterior of cakes and the like, and pertains more particularly to structure enabling the selective closure of the filling opening of the bag during the dispensing operation.

Flexible and collapsible pastry bags of the general character with which the instant invention is concerned incorporate in their structure a container having a relatively large filling opening at one end through which the viscous comestible is introduced, with such container having a relatively small dispensing opening at its other end. For the most part, such containers are tapered from the filling to the discharge end with the lateral confines of the container being constituted of a flexible sheet material which may be formed of a synthetic resin or plastic material, or of paper or a fabric processed or treated, such as, for example, by being impregnated by a synthetic resin, to possess sufficient strength and imperviousness to the viscous comestible material.

The application of decorating material to the top and sides of an iced cake is an art and the artist or cake decorator uses a device known as a pastry bag in a manner somewhat analogous to the manner a painter uses a brush.

The material employed is in the nature of a confection that is sufficiently viscous as to hold its shape, that is, be resistant to slumping after being dispensed from the bag. Such resistance to slumping or flowing is thought to be enhanced by such material possessing thixotropic properties. Some types of such material may tend to surface harden by reason of water evaporation after being dispensed from the bag. In any event, recipes for making suitable decorating material are well known in the art. The material is suitably colored by food dyes, and ordinarily separate pastry bags are used for each color being used.

The discharge opening of the pastry bag has a size and cross section suitable to the purpose of the user, much as a painter uses different forms and sizes of brushes to carry the foregoing analogy a bit further.

Some forms of pastry bags include means at the discharge end of the bag that enable a user to removably couple a dispensing tip (selectable from a set of tips having dispensing orifices of different sizes and cross section shapes), whereby the user can selectably establish the size and shape of the outlet opening.

To use a pastry bag of the general type with which the present invention is concerned, the user opens the filling opening and places a charge of decorating material in the bag after which the user closes the filling opening, such closure ordinarily being effected by grasping the side wall adjacent the filling opening so that the side wall is essentially in a tightly puckered condition and constitutes a restriction against the charge in the bag from escaping through the filling opening. The integrity of the closure is usually further assumed by the user axially twisting the bag through the puckered region and holding the same in such condition during the dispensing operation. Alternatively, the user can flatten and abut the side walls at the opposite sides of the filling opening to effect the closure, and additionally enhance the security of the closure by either axially twisting the bag or transversely folding the bag adjacent the filling opening.

After the charge is trapped in the bag, so to speak, on closing the filling opening, the user then squeezes the sides of the bag to raise the internal pressure of the charge so that such viscous charge is dispensed through an outlet opening or orifice. The squeezing can be accomplished in various ways, such as by directly gripping the bag, or by either axially twisting the bag or by rolling the bag from its filling end.

The artist effects the desired decoration by manipulating the bag relative to the cake while controlling the dispensing rate by varying the squeezing pressure applied to the bag. Such decorations take many well known forms involving various combinations of messages (printed and script), scenes, border designs, and ornamental work such as flowers, flower buds, etc.

After the content of the bag has been largely depleted or the user desired for any reason to augment the quantity of the charge in the bag, the side wall is manipulated to open the filling opening. Additional decorating material is then placed in the bag and the bag is again closed as described above for continuing the dispensing operation.

Unfortunately the steps set forth in the preceding paragraph are very difficult and well nigh impossible to effect in a tidy fashion. In short, such steps almost always result in some of the cake decorating material being deposited at undesirable locations such as on the exterior of the bag, on the work table, on the user's hands and garments, to name a few. Such is unfortunate for a plurality of reasons such as the object being decorated may be marred by misplaced material, frequent and time consuming cleanups are necessitated, the user finds working under messy conditions unpleasant, satisfactory sanitation standards are more difficult to maintain, decorating material is wasted, material deposited about the filling opening makes it tedious for the user to locate and separate the side wall to effect the opening, cleaning of the bag for subsequent reuse is more difficult, and material deposited on the exterior of the bag may tend to become brittle and thereafter flake off on bag flexure to fall on the workpiece and elsewhere.

Inasmuch as many people take considerable interest in observing cake decorators' performing their artistry, it is unfortunate from the standpoint of pastry enterprises when the decorating is done under such seemingly slovenly conditions that allowing the public to observe might contribute to the loss of potential customers.

It is the paramount object of the present invention to enable a user to close, to maintain closed during dispensing, and to reopen and recharge a pastry bag in a manner that will greatly reduce the misplacement of decorating material while additionally facilitating the user in effecting such steps.

Ancillary objects of the present invention is to provide a pastry bag that realizes the foregoing object, and which pastry bag will be durable and of only moderately greater cost than unimproved bags.

A broad aspect of the invention involves in a pastry bag of the type comprising an elongated and collapsible container having a filling opening at one end and a relatively small dispensing opening at its other end, said container having a transversely continuous side wall of flexible sheet material, said side wall having a marginal portion at said one end of the container that has an inner side that extends about and bounds said filling opening, said marginal portion being foldable to abut its inner side of one half of its extent about said filling opening against the inner side of the other half of such extent to close the filling opening; the improvement comprising, in combination therewith, the provision of means for releasably holding said marginal portion of the side wall folded to close the filling opening.

Other objects, features and advantages of the invention will become manifest in the light of the ensuing description of a preferred embodiment of the same, such being given in conjunction with the accompanying drawings, wherein:

FIG. 3 is a side elevational view of the pastry bag when the same is in essentially fully collapsed condition, with lines upon which the bag may be folded, subsequent to its filling and closure of its filling opening, being indicated by dashed lines;

FIG. 4 is another side elevational view of the bag; this view being at right angles to the view shown in FIG. 3 with the bag being filled, the filling opening closed, and a portion of the side wall removed;

FIG. 5 is a sectional view taken upon the plane of the section line 5—5 shown in FIG. 3;

FIG. 6 is a sectional view generally similar to that of FIG. 5, except that the filling opening is partially opened with the attaching strips being completely unmeshed; and, FIG. 7 is an enlarged sectional detail view taken upon the plane of the section line 7—7 in FIG. 3.

Figure 1:
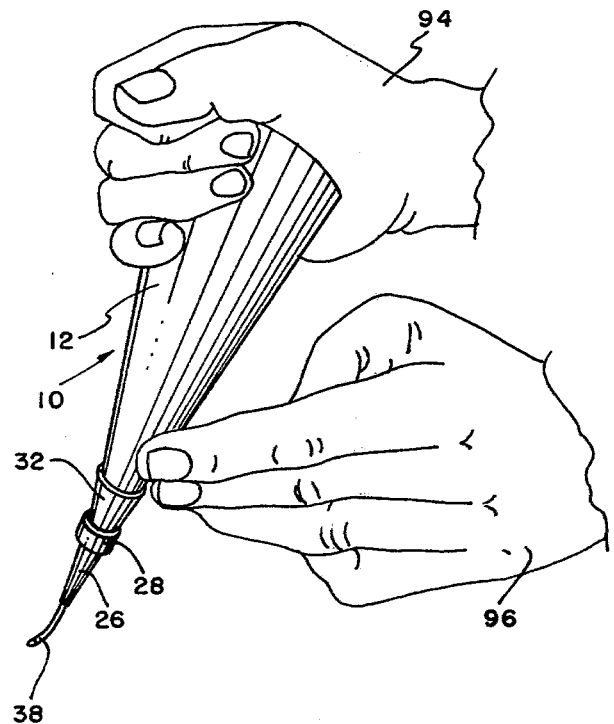
FIG. 1 is an isometric view of the pastry bag of the instant invention, the same being shown in use in conjunction with the hands of the user.

Referring now to the drawings, wherein like numerals designate like parts throughout the various views, the reference numeral 10 designates the improved pastry bag generally. The bag 10 is in the nature of an elongated and tapering flexible and collapsible container having relatively large and small openings respectively disposed at its major and minor ends, such bag being comprised of a side wall 12 formed of a flexible sheet material that is impervious to the viscous confection or icing content 14 (see FIG. 4) of the bag 10 under conditions of use of the latter. The sheet material of the side wall 12 can be a woven fabric of nylon or polyester fibers that is impregnated with a synthetic resin or plastic material such as neoprene or the like. For reasons to be given later, it is preferred that the sheet material be such that the same can be permanently shaped such as to have fold lines coupled with resiliency to restore such shape when in repose. Such fold lines are preferably folds about a short radius as contrasted with sharp crease lines which might be considered as folds or bends about a near zero radius.

As the specific character of the sheet material does not in and of itself constitute the subject matter of the instant invention, it should be apparent to those skilled in the art that a wide latitude of choice can be exercised in selecting a sheet material suitable for fabrication of the side wall 12.

The side wall 12 is formed from a suitably shaped blank of the sheet material by overlapping and securing two edge margins together as at 16 (by heat sealing techniques appropriate to the sheet material or by the use of a suitable cement or adhesive) so that the side wall 12 is of a generally frustoconical configuration so as to taper in transverse extent about the longitudinal extent of the container or bag 10 between the filling and outlet ends of the side wall 12 respectively indicated at 18 and 20.

The outlet opening or dispensing orifice of the bag 10 is preferably comprised in a conventional manner by a hollow coupling member 24 sealingly fitted in the minor open end of the side wall 12. Such member 24, conventionally of plastic, is a well known and common device and does not in and of itself constitute novel or inventive subject matter in the present case; suffice to say that the same projects from the minor end of the side wall with a conically tapered exterior (not shown) for accommodating thereon a metallic and conically shaped dispensing element 26 known to those conversant in the art as a tip. The tip 26 is removably retained on the coupling member by a plastic retaining nut 28 that embraces the tip 26 and which threadingly engages external threads (not shown) on the coupling member 24. It is customary that the user will have at hand an assortment of tips that can be interchangeably or selectably coupled to the bag 10 by the conventional coupling structure described above. It will be understood that the conventional assortment of tips includes tips having different sized orifices and/or orifices of different transverse configurations (not shown) at its outlet end 30.

In the preferred construction, and as customary in the art, a strip or band of reinforcing sheet material 32 is bound about and suitably bonded to the side wall 12 at a position such as to axially overlap and extend above the coupling member as viewed in FIGS. 3 and 4. The band 32 may be and preferably is of the same material as the side wall 12.

The bag 10 has a filling opening 34 which is simply defined by the side wall 12 terminating in a free edge 36 at the major end of the bag 10.

As thus far described the preferred form of the invention is conventional and well known in the art.

The opening 34 can be closed by the user's simply collapsing the major end portion of the bag 10 to seat one-half portion of the side wall 12 bounding the opening 34 against the other half, with the security of such closure of the filling opening being thereafter enhanced by the user, for example, folding the collapsed side walls about a line normal to the longitudinal extent of the bag 10. Unfortunately, the security of such closure, even when enhanced by folding, leaves much to be desired, as all too often, icing 14 will escape or be forced out the filling opening 34 at a rate that may greatly exceed the rate at which icing 14 is dispensed through the tip 26 as indicated at 38 in FIG. 1.

The improved pastry bag 10 is specially provided with means for maintaining the security of such closure (opening bounding halves of the side wall 12 seated against each other), such means being selectively releasable so that the filling opening 34 can be reopened for refilling the bag 10 with the viscous confection or icing 14. In the presently preferred form of the invention, the stated means takes the form of a pair of elongated fastening or attaching strips 40 and 42 of mating character that are of equal lengths and which are attached in end-to-end relationship to each other to the inner side of the side wall 12 to constitute a continuous band completely encircling and bounding the filling opening 34.

It is to be expressly noted that in the preferred construction the band constituted of the strips 40 and 42 is spaced an interval 44 from the free end 36 of the side wall 12. The purpose of such spacing will be presently explained.

The fastening strips 40 and 42 are of conventional character and suitable forms thereof are on the market, the same being distributed by Donahue Sales, Talon Division of Textron, New York, N.Y. 10022, under the trademark VELCRO. The strips 40 and 42, which can be bonded or secured to the side wall 12 by any suitable technique or adhesive, or simply by spaced rows of stitching 44 and 46. The strips 40 and 42 are well known and in wide use in apparel, toys and games, etc., and are such that their exposed or facing surfaces as viewed in FIG. 6 will strongly tend to adhere to each other when they are pressed together, and they can thereafter only be forced apart or pulled apart on the application of considerable force for such purpose. The strips 40 and 42 adhere to each other when forced together for the reason that they respectively have their adjacent faces provided with flexible and resilient hooks and loops of plastic material (commonly nylon, polyester or blends thereof) that become emmeshed or engaged with each other when pressed together. The flexibility and resiliency of the hooks and the loops enable forced separation of the strips 40 and 42 after which the hooks and loops reassume essentially their initial positions of repose enabling repeated fastening and release of the strips 40 and 42.

From the foregoing it will be evident that, when the opening 34 is closed by urging halves of the opening bounding side wall together with the strips 40 and 42 respectively extending along such halves, the entire extent of the strip 40 mates and engages with the entire extent of the strip 42 so that the opening 34 is held closed and will remain so closed until the strips 40 and 42 are forcefully peeled or pulled apart.

In order to facilitate precise registry of the entire extent of the hook fastener strip 40 with the entire extent of the loop fastener strip 42 when the side wall 12 is collapsed to close the filling opening, the side wall 12 is, in the preferred construction, provided with a pair of permanent folds along longitudinally extending and diametrically opposed lines 50 and 52 that coincide with the end-to-end abutting junctures 54 of the strips 40 and 42. The permanent folds of the side wall 12 along the lines 50 and 52 are preferably not extremely sharp creases such as might tend to weaken the side wall 12 with repeated flexing along the folds over a period of time, but rather are permanent folds about a short but nonzero radius, say, about 1/64 inch. The folds are permanent in the sense that such folds reestablish themselves when the side wall 12 is in repose by reason of the resiliency of the side wall 12. The folds can be made in any suitable manner, and can be formed with some types of sheet material constituting the side wall 12 by applying heat to the side wall 12 along the lines 50 and 52 while held in the desired folded shape (such as by being tensioned about appropriately dimensioned round wires or other forming structure) and continuing to hold the same until the side wall 12 has cooled.

Figure 2:
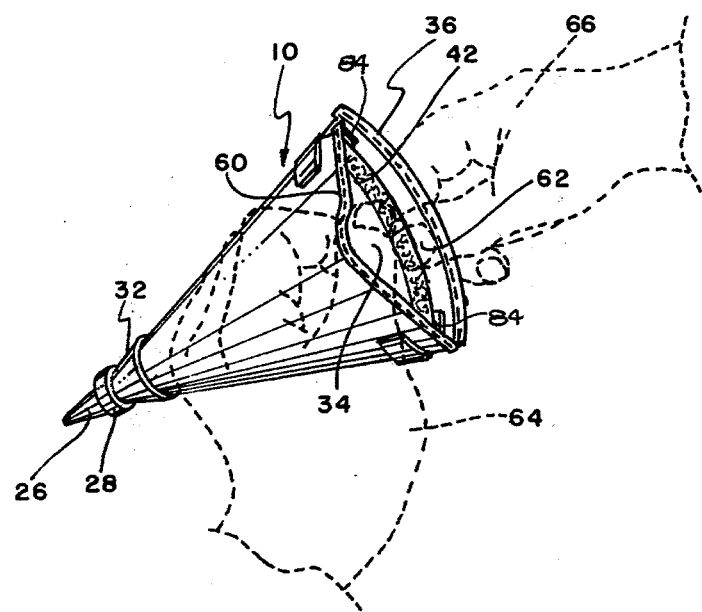
FIG. 2 is an isometric view of the pastry bag on a somewhat reduced scale, the same showing the filling opening thereof open in conjunction with the user's hands shown in dashed outline as they are applied to effect such opening.

The side wall intervals 44 between the strips 40 and 42 and the free edge 36 of the side wall 12 are for the purpose of constituting finger grips 60 and 62 for the user to grasp and to pull apart when peeling or forcing the strips 40 and 42 apart in the manner shown in FIG. 2 wherein the user's hands shown in dashed outline are indicated at 64 and 66. An incidental benefit of the intervals 44 resides in the fact that the likelihood of or extent of icing 14 escaping from the interior of the bag 10 and getting on the exterior surface of the side wall 12 during the cyclic operations of filling, closing, and reopening the bag 10 is substantially reduced.

Ease of separation of the finger grips 60 and 62 so that they can be grasped is assured by the provision of means thickening the side wall 12 at its free edge 36. Such thickening can be effected by hemming the side wall 12 along its edge 36 (not shown), or by folding a strip of sheet material 70 about the edge 36 and sewing the same in position by a line of stitching 72.

So that the peeling forces can be applied into close proximity of the strip junctures 54, the side wall 12 is cut along the fold lines 50 and 52 from the free edge 36 across the interval 44 to adjacent both of the junctures 54, such cuts being indicated at 76. As the cuts 76 tend, in the use of the finger grips 60 and 62, to cause stress concentration in the region of the junctures, the preferred construction optionally includes means for preventing undesired growth in the length of the cuts 76, and such means comprises the provision of a pair of reinforcement patches 80 and 82 bonded or suitably secured to the side wall 12 at the position of the strips 40 and 42 and extending across the fold lines 50 and 52. The patches 80 and 82 are of a sheet material and can be of the same type as that of the side wall 12. The patches 80 and 82 are shown applied to the exterior of the side wall 12. Optionally, such patches can be secured to the inner surface of the side wall 12 intermediate the latter and the strips 40 and 42. Such optional or supplemental internal patch placement is shown at 84 in FIG. 6.

From the foregoing the use of the bag 10 will have already have become evident, though it might be helpful to point out that the thinness and flexibility of the fastening means constituted of the fastener strips 40 and 42 enable the user, if desired, in preparation to refilling the bag 10 wrong side out, so to speak, to a position intermediate the strips 40 and 42 and the dispensing end of the bag 10, whereby the user can largely avoid icing 14 covering on the strips 40 and 42, which is a delight to especially meticulous or neat persons. It should be noted that icing 14 on the strips 40 and 42 has not been found to result in significant impairment of their function (certainly not if lightly wiped with the edge of a spoon or the like preparatory to closing the opening 34) or in any other deleterious consequences.

The security of the closure of the opening 34 has been found to be such in association with the thinness and flexibility of the strips 40 and 42 that it has been found convenient (after closure of the opening 34 and finger pressing the strips 40 and 42 into fastening engagement with each other) to fold the bag 10 over along the dashed diagonal lines 90 and 92 shown in FIG. 3 and then to seat the major end of the bag against the palm of the user's hand 94 that then grips the major end of the bag 10 to extrude icing 14 therefrom. As the icing 14 content of the bag 10 diminishes, the gripped major end of the bag 10 is folded or rolled upon itself. The other hand 96 of the user is employed in the customary manner to guide the dispensing action and if desired to augment the pressure to which the icing 14 is subjected by squeezing and/or axially twisting the bag 10.

Needless to say, it is not essential that the bag 10 be used as set forth in the preceding paragraph by way of suggestion, and this is particularly true inasmuch as there are nearly as many techniques employed in the pastry decorating art as there are devotees of the art.

Attention is now directed to the appended claims for an appreciation of the scope of the invention.

I claim:

1. In a pastry bag of the type comprising an elongated and collapsible container having a filling opening at one end and a relatively small dispensing opening at its other end, said container having a transversely continuous side wall of flexible sheet material, said side wall having a marginal portion at said one end of the container that has an inner side surface that extends about and bounds said filling opening, said marginal portion being foldable to abut its inner side surface for one half its extent about said filling opening against the inner side surface of the other half of its extent to close the filling opening; the improvement comprising, in combination therewith, the provision of means secured to and extending along the inner side surfaces for releasably holding said inner side surfaces of the marginal portion of the side wall together in substantially abutting relationship to close the filling opening, with said halves of the extent of the inner surfaces of the marginal portion being specifically defined and distinct parts of such extent, said holding means including first and second complementary and coacting components secured respectively to the inner side surfaces of said one half and said other half of their extent about the filling opening, and said inner side surfaces of the marginal portion having free edges at said one end of the container, with said components of the holding means being spaced from said free edges intervals sufficient to enable a user to finger grip such intervals for forcing the components of the holding means apart.

2. In a pastry bag of the type comprising an elongated and collapsible container having a filling opening at one end and a relatively small dispensing opening at its other end, said container having a transversely continuous side wall of flexible sheet material, said side wall having a marginal portion at said one end of the container that has an inner side that extends about and bounds said filling opening, said marginal portion being foldable to abut its inner side of one half its extent about said filling opening against the inner side of the other half of such extent to close the filling opening; the improvement comprising, in combination therewith, the provision of means for releasably holding said marginal portion of the side wall folded to close the filling opening, said halves of the extent of the marginal portion being specifically defined and distinct parts of such extent, said holding means including first and second complementary and coacting components secured respectively to the inner sides of said one half and said other half of the extent of the marginal portion, said side wall having a pair of spaced folds formed therein that extend along the length of the container and which intersect the extent of the marginal portion at the positions where the halves of the extent of the marginal portion adjoin each other, said marginal portion having a free edge at said one end of the container, with said components of the holding means being spaced from said free edge an interval sufficient to enable a user to finger grip such interval for forcing the components of the holding means apart, and with said interval of the marginal portion being along said folds.

3. In a pastry bag of the type comprising an elongated and collapsible container having a filling opening at one end and a relatively small dispensing opening at its other end, said container having a transversely continuous side wall of flexible sheet material, said side wall having a marginal portion at said one end of the container that has an inner side surface that extends about and bounds said filling opening, said marginal portion being foldable to abut its inner side surface for one half its extent about said filling opening against the inner side surface of the other half of its extent to close the filling opening; the improvement comprising, in combination therewith, the provision of means secured to and extending along the inner side surfaces for releasably holding said inner side surfaces of the marginal portion of the side wall together in substantially abutting relationship to close the filling opening, with said halves of the extent of the inner surfaces of the marginal portion being specifically defined and distinct parts of such extent, said holding means including first and second complementary and coacting components secured respectively to the inner side surfaces of said one half and said other half of their extent about the filling opening, and said side wall having a pair of spaced folds formed therein that extend along the length of the container and which intersect the extent of the marginal portion at the positions where the halves of the extent of the inner side surfaces of the marginal portion adjoin each other, said inner side surfaces of the marginal portion having free edges at said one end of the container, with said components of the holding means being spaced from said free edges intervals sufficient to enable a user to finger grip such intervals for forcing the components of the holding means apart.

* * * * *